United States Patent
L'Hermite et al.

(10) Patent No.: US 6,392,906 B2
(45) Date of Patent: *May 21, 2002

(54) CIRCUIT AND METHOD FOR A PULSE WIDTH MODULATED

(75) Inventors: Francois L'Hermite, Lasserre; Joel Turchi, Toulouse, both of (FR); Josef Halamik, Roznov P.R. (CZ)

(73) Assignee: Semiconductor Components Industries LLC, Phoenix, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/580,324

(22) Filed: May 26, 2000

(30) Foreign Application Priority Data

Jun. 1, 1999 (EP) .............................. 99401318

(51) Int. Cl.$^7$ ................................. H02M 3/24
(52) U.S. Cl. ...................... 363/97; 363/49; 363/21.11; 363/21.18
(58) Field of Search ............................. 363/21, 41, 97, 363/49, 131, 21.01, 21.04, 21.07, 21.08, 21.1, 21.11, 21.15, 21.16, 21.18

(56) References Cited

U.S. PATENT DOCUMENTS

| | | | |
|---|---|---|---|
| 5,640,317 A | * | 6/1997 | Lei .............................. 363/49 |
| 5,689,407 A | | 11/1997 | Marinus et al. ............... 363/21 |
| 5,812,383 A | | 9/1998 | Majid et al. ................. 363/21 |

OTHER PUBLICATIONS

Philips Semiconductors, XP–002122143 Data Sheet—Tea 1556 GreenChip, SMPS Module, Apr. 20, 1999.
Motorola, XP–002122144, MC44508, Few External Components Reliable and Flexible Greenline Very High Voltage PWM Controller, Jul. 1999.

* cited by examiner

Primary Examiner—Jessica Han
Assistant Examiner—Gary L. Laxton

(57) ABSTRACT

A pwm controller 10 which includes a Vcc node (pin 6); a start-up current source 180 connected to the Vcc node; and a driver circuit 150, 190 also connected to the Vcc node, wherein the pwm controller 10 is arranged to operate in a first phase in which the start-up current source supplies 180 current to the Vcc node but the driver circuit is turned off; a second phase in which the driver circuit 150, 190 is enabled and draws current from the Vcc node; and a third phase in which both the start-up current source 180 and the driver circuit 150, 190 are turned off whereby very little current may be drawn from the Vcc node (pin 6) during the third phase.

5 Claims, 3 Drawing Sheets

CIRCUIT AND METHOD FOR A PULSE WIDTH MODULATED

FIELD OF THE INVENTION

This invention relates to a pulse-width modulated (pwm) controller, and particularly for such a controller when used to control a switched-mode power supply.

BACKGROUND OF THE INVENTION

Switched-Mode Power Supplies (SMPS) are being increasingly used in many domestic and industrial applications. In applications such as television or computer monitor, the application may require a number of states or modes. of operation. A first 'off' mode occurs when there is no power supplied to a device (or when a master switch is off); a second 'on' mode occurs when the device is switched on an operating normally; and a third mode (referred to as a standby mode) occurs when the device is to remain powered, but with reduced functions and reduced power consumption. A standby mode may be encountered in a television via an 'off' switch of a remote control, which typically does not switch the television fully off, but allows certain circuitry within the television to remain powered, so that if the 'on' button of the remote control is pressed, the television will return to the 'on' mode.

There is a need to reduce the power consumed by the SMPS during standby mode, so that use of mains electricity is reduced. At present there is a goal to reduce the power consumption to a value of the order of 1 Watt.

Burst mode SMPS are known, which have an efficient power consumption in standby mode. However, there is a problem with SMPS operating in a burst mode which is that the periodicity of the bursts (or the frequency of bursting) will typically lie within the audible frequency range. This tends to generate audible noise for reasons which are not well understood and are certainly not predictable in advance of a finished prototype. Altering the frequency of bursting can help to reduce the noise as can altering the peak current generated by the SMPS during each burst (note this may be achieved if the frequency of bursting—or at any rate the duty rate of bursting—is increased without reducing the averaged power supplied to the microprocessor on the secondary side of the SMPS). Typically, however, there is no way to alter the frequency of bursting meaning that designers must simply hope that the finished product is not too noisy in standby mode.

This invention seeks to provide a PWM controller which mitigates the above mentioned disadvantages.

SUMMARY OF THE INVENTION

According to the present invention there is provided a PWM controller according to claim 1.

The advantage of such a controller having a third phase of operation (which may also be referred to as a latched-off phase) is that the duty cycle and the frequency of bursting during a standby-mode of operation may be greatly reduced without having to especially adapt the rate at which the start-up current source provides current to the Vcc node during the first phase (often referred to as a start-up phase), because the latched-off phase can be made relatively long compared to either of the other phases (when in standby mode).

Preferably, the pwm controller includes a third mode duration controller for controlling the duration of the third mode. The advantage of this is that the frequency of bursting may be varied to accommodate different circumstances. For example, there are two major reasons that the pwm controller could enter into a bursting mode of operation. The first is when there is a fault condition such as the secondary side demanding too much power (i.e. more than the SMPS is designed to deliver) probably as a result of a short circuit in the device being supplied by the secondary side. In this situation, it is desirable that the bursting frequency should be as low as possible, and since this condition represents an undesired state of affairs, there is no harm in any audible noise generated by the SMPS since it is desirable that this fault should be corrected rather than tolerated. The second reason for the pwm controller to enter a bursting mode of operation is when the SMPS is in a standby mode. In this mode, the most important consideration is the amount of audible noise which is generated by the SMPS as a whole as a result of any mechanical resonance in the transformer or other parts of the SMPS. Having a third mode duration controller which is able to vary the bursting frequency during standby mode compared to a fault condition, permits a standby bursting frequency to be used which will cause the least possible audible noise.

Preferably, the pwm controller includes a Vcc detector connected to the Vcc node for detecting the voltage at the Vcc node, wherein the third phase is commenced when the detected voltage at the Vcc node falls below a first under voltage level and is ended when the detected voltage at the Vcc node falls below a second under voltage level. This provides a very simple way to determine when the pwm controller should be in a third or latched-off phase.

Preferably, the third phase duration controller includes a third phase current controller for controlling the amount of current drawn by the pwm controller from the Vcc node during the third phase. Preferably, the third phase current controller includes a programming node to which an external programming resistor may be connected (between the programming node and ground), such that the rate at which current drawn by the pwm controller from the Vcc node may be set by choosing an appropriate programming resistor (the rate will vary in an inverse dependence to the value of the programming resistor). This provides a particularly convenient way for a designer using the pwm controller to alter the frequency of bursting during standby mode to minimize audible noise, since resistors are cheap and there are many different magnitudes of resistance available (corresponding to many different frequencies of bursting).

Preferably, the pwm controller further includes a switch which is switchable between a first position in which the programming node is connected to a first voltage source which is ultimately powered from the Vcc node and a second position in which the programming node is isolated or is connected to a second voltage source which is ultimately powered from the Vcc node but which causes less current to be drawn from the Vcc node, for a given programming resistor, than when the switch is in its first position. In this way, the frequency of bursting may be varied between a first frequency when in standby mode (when the switch is in its first position) and a second (usually lower) frequency when in a fault mode.

BRIEF DESCRIPTION OF THE DRAWING(S)

An exemplary embodiment of the invention will now be described with reference to the drawing in which.

DETAILED DESCRIPTION OF A PREFERRED EMBODIMENT

Figure 1:
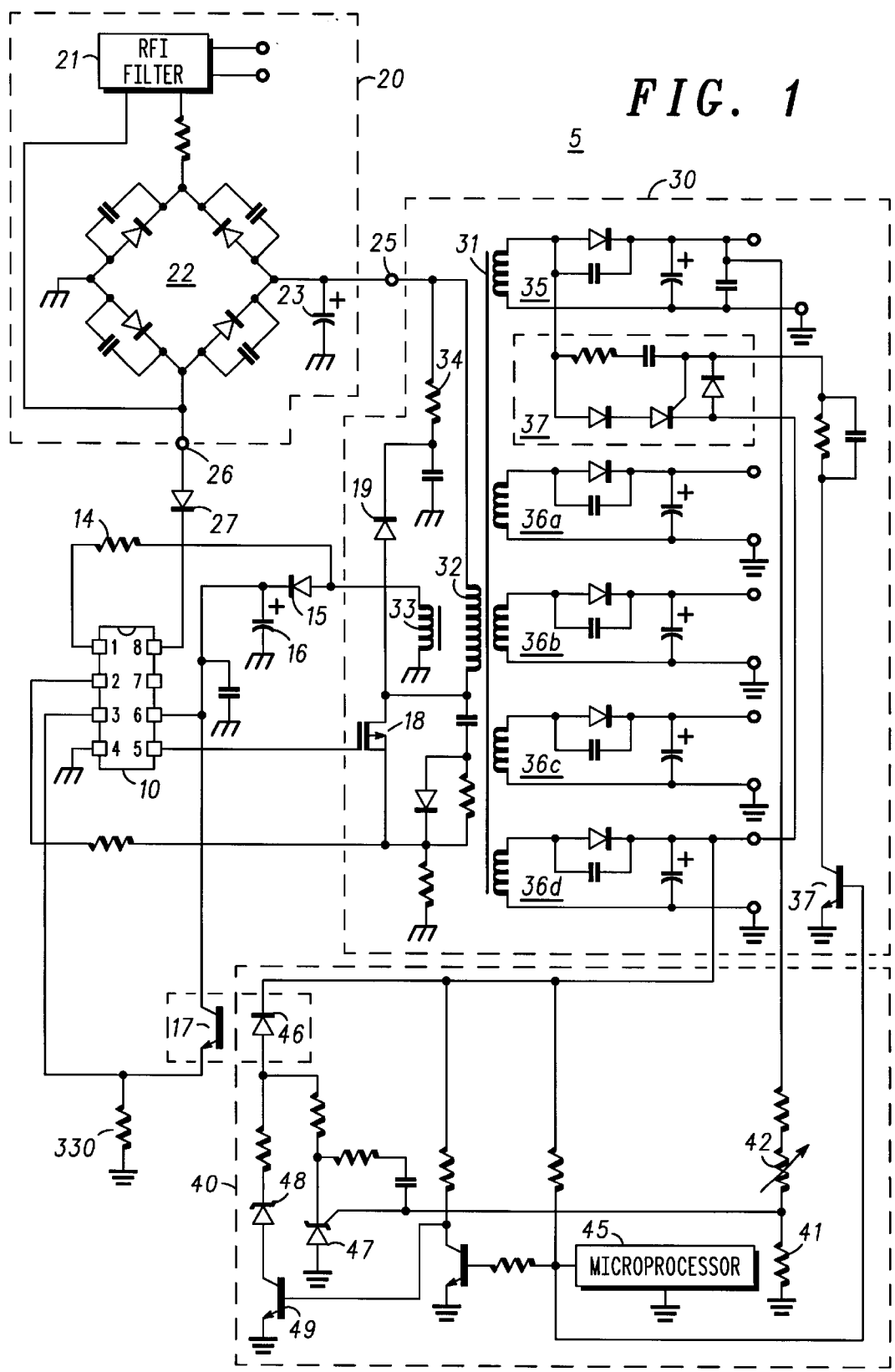
FIG. 1 shows a switched-mode power supply incorporating a pwm controller in accordance with the invention.

Referring to FIG. 1, there is shown a switched-mode power supply arrangement (SMPS) 5, as might be found in a domestic appliance requiring a high-voltage supply, such as a television. A typical domestic appliance of this nature may include the feature of a standby mode of operation, whereby the appliance remains switched on, but with reduced functionality and reduced power consumption. The SMPS arrangement 5 includes a pwm controller 10, a mains supply arrangement 20, a transformer arrangement 30 and a microprocessor and regulation arrangement 40.

The pwm controller or control circuit 10, which will be further described with reference to FIG. 2 below, is integrated as a semiconductor package having 8 connection pins.

The mains supply arrangement comprises a filter 21, a diode bridge 22 and a bulk capacitor 23 arranged to provide a rectified signal to a node 25. A further node 26 provides a signal directly from the filter 21 to pin 8 of the control circuit 10, via a diode 27.

The transformer arrangement 30 has a magnetic core 31, a primary winding 32 and an auxiliary winding 33 arranged on one side of the core. The primary winding 32 has one node coupled to the node 25, and a further node coupled to a clamping transistor 18 to be further described below. The auxiliary winding has one node coupled to ground and a further node coupled to pins 1 and 6 of control circuit 10 via a resistor 14, and diode 15 with capacitor 16 respectively.

A high-voltage secondary winding 35 and low-voltage secondary windings 36a, b, c and d are arranged on the other side of the core. The high voltage winding 35 is arranged to provide a high voltage supply (~100V) to appropriate high voltage components of the appliance (not shown) during normal mode of operation. The low voltage windings 36a, b, c and d are arranged to provide low voltage supplies (~10V) to various low voltage components of the appliance. Secondary winding 36d is coupled to provide a low voltage supply for the microprocessor and regulation arrangement 40, which is also for regulation purposes, to be further described below.

When the control circuit 10 decides that regulation is necessary, a signal from pin 5 of the circuit 10 turns on a clamping transistor 18, which clamps both nodes of the primary winding 32 to the node 25, via a clamping network of diode 19 and resistor 34. In this way the clamping transistor 18 acts as a power switch.

The microprocessor and regulation arrangement 40 has a microprocessor 45 arranged to control the management of the standby mode (and normal mode) of operation of the SMPS, in addition to other functions (not shown). When the power supplied to the secondary side of the transformer arrangement 30 has reached the desired level, regulation is achieved via an optocoupler arrangement in series with a regulating diode 47.

The breakdown voltage of the regulating diode 47 is adjustable via a potential divider circuit of resistor 41 and output level variable resistor 42, coupled to the output of the high voltage winding 35. In this way the regulating diode conducts a current according to the voltage obtained by the resistor divider arrangement of resistor 41 and output level variable resistor 42. This current flows through a Light Emitting Diode (LED) 46 of the optocoupler arrangement, inducing a signal in a photovoltaic cell 17 thereof. The photovoltaic cell is coupled between the storage capacitor 16 and pin 3 of the PWM control circuit 10.

When the appliance switches to standby mode, the high voltage components of the appliance no longer require power. The microprocessor 45 reconfigures the secondary windings of the transformer arrangement 30 by turning on a transistor 37 which effectively clamps the high voltage winding 35 to a rectified voltage of the secondary winding 36d via the diode arrangement 37. The microprocessor also turns on a transistor 49, which effectively inserts a second zener diode 48 into the path of the LED 46, thus providing a means of regulation in standby mode.

Figure 2:
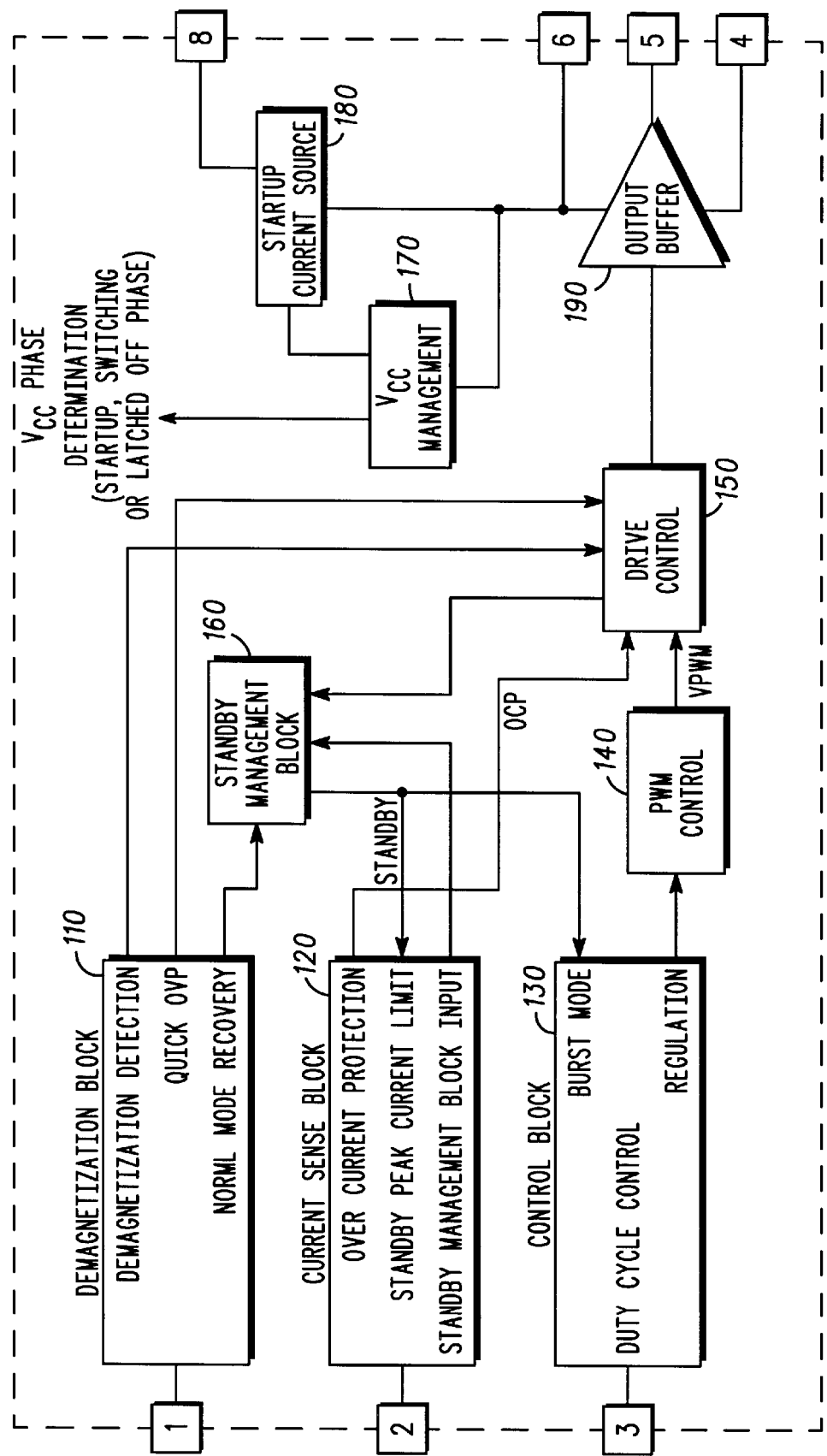
FIG. 2 shows a block diagram of the pwm controller forming part of the switched-mode power supply of FIG. 1.

Referring now also to FIG. 2, there is shown a block diagram of the control circuit 10. Essentially, three control pins, pins 1, 2 and 3 provide inputs for all of the required variable signals used to control the SMPS. Pin 1 accommodates a zero current detection input and a negative voltage clamp. Pin 2 combines overcurrent protection with a standby peak current limit value. Pin 3 combines the current sense voltage (regulation) input with standby regulation.

The remaining pins provide supply and output connections: Pin 4 is coupled to ground, pin 5 drives the power switch arrangement of clamping transistor 18, pin 6 is coupled to the auxiliary winding 33 via the bulk capacitor 16 (Vcc), and pin 8 is coupled to node 26 of the mains supply arrangement 20.

Regulation is provided in the following way. The control block 130 is coupled to receive a regulation signal from pin 3. This is used to inform the drive control block 150, via the PWM control block 140, of the desired duty cycle of the output, which is then used to drive the output buffer 190 accordingly to control the power switch arrangement of clamping transistor 18. The drive control block 150 and the output buffer 190 together form a drive circuit 150, 190 which together draw the majority of power required by the pwm controller 10 when in its second or switching phase.

Standby mode and normal mode are detected by the standby management block, which takes inputs from the demagnetization block 110 (pin 1), the current sense block 120 (pin 2), and from the control block 130 (pin 3 via the drive control block 150). The mode detection is to be further described below with reference to FIG. 4.

When standby mode commences, the microprocessor 45 reconfigures the secondary side of the transformer arrangement 30 as described above. Due to the reconfiguration of the transformer arrangement 30 the regulation signal Vpwm will effectively regulate the high-voltage winding 35 to a voltage level in the order of 10V. The voltages of all of the secondary windings will be reduced, which in turn causes the current developed in the auxiliary winding 33 to drop below that required to maintain power to the control circuit 10. At this time power is drained from the bulk capacitor 16 which causes Vcc to fall slowly.

Figure 3:
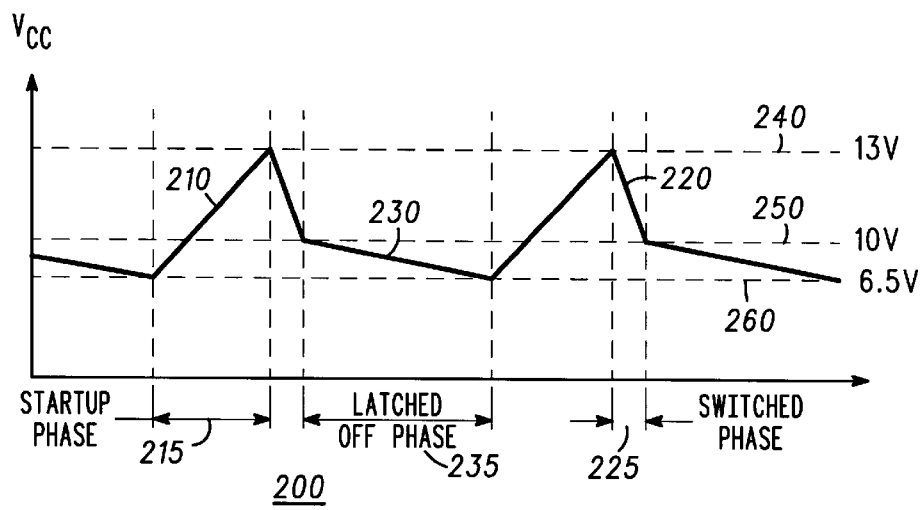
FIG. 3 shows a graph illustrating operating phases of the control circuit of FIG. 2.

Referring now also to FIG. 3, there is shown a graph illustrating three operating phases of the control circuit 10, in terms of the behavior of Vcc during standby mode.

In a first phase (so-called startup phase) 215, insufficient current is provided by the auxiliary winding 33 to power the control circuit 10, leading to Vcc being below a second undervoltage level 260, to be further described below (for example when the arrangement is turned on, or in standby mode as described in the preceding paragraph). During this first phase 210, the start-up current source 180 draws current directly from the filter 21 via the node 26 and diode 27, and supplies the current to the storage capacitor 16 which causes Vcc to rise steadily during this phase (line 210) until Vcc reaches a start-up threshold 240 (determined and detected within the Vcc management block 170).

In a second phase (so-called working phase) 225, the PWM control circuit 10 operates normally, drawing current from Vcc. (if the arrangement is in normal mode, Vcc would stay at or above the first undervoltage level 250, and the circuit 10 would continue operating normally). In standby mode, Vcc drops due to the insufficient current developed from the auxiliary winding 33 (line 220), until Vcc reaches a first under-voltage level 250.

In a third phase (so-called latched-off phase) 235, the control circuit 10 is switched off, as is the startup current source 120. Thus in this third phase, very little current is drawn from Vcc, and Vcc therefore falls only very slowly, until it reaches a second under-voltage level 260, whereupon the startup current source is again turned on, reverting again to the first phase 215.

Figure 4:
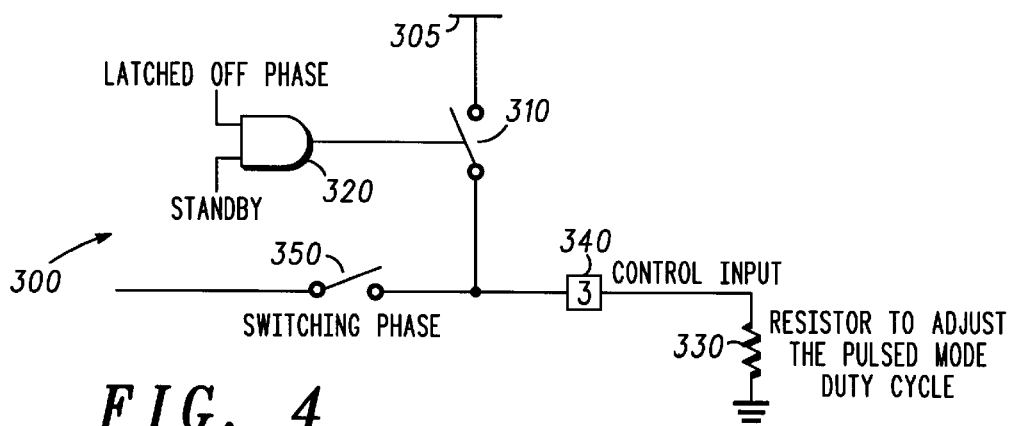
FIG. 4 shows an illustrative block diagram of a third phase duration controller forming part of the pwm controller of FIG. 2.

Referring now also to FIG. 4, there is shown a third phase duration controller 300 (which in this case comprises solely a third phase current controller) including a first voltage source 305, which is ultimately powered from the Vcc node (pin 6) a standby versus fault switch 310, a standby versus fault and latched-off versus start-up or switching phase logic gate 320, programming resistor 330, programming node 340 (pin 3) and switching phase switch 350. The standby versus fault switch 310 acts to connect the first voltage source 305 to the programming node 340 when it is in its first on position and to isolate the programming node 340 from the first voltage source 305 when it is in its second position. The position of the switch 310 is determined by logic gate 320 which acts to switch switch 310 into its first position only when the pwm controller 10 is in its third or latched off phase AND the SMPS as a whole is in a standby mode rather than a fault mode. The way in which this is detected by the pwm controller is described in greater detail below. Programming resistor 330 is connected between the programming node 340 and ground and acts to draw a programmable amount of current from the voltage source 305 (and thus ultimately from Vcc node—pin 6) when switch 310 is in its first position. Finally, switching phase switch 350 simply acts to disconnect pin 3 from regulation control means within the pwm controller 10 when the pwm controller is not in a switching or second phase such that pin 3 can be used for different functions during different phases.

Figure 5:
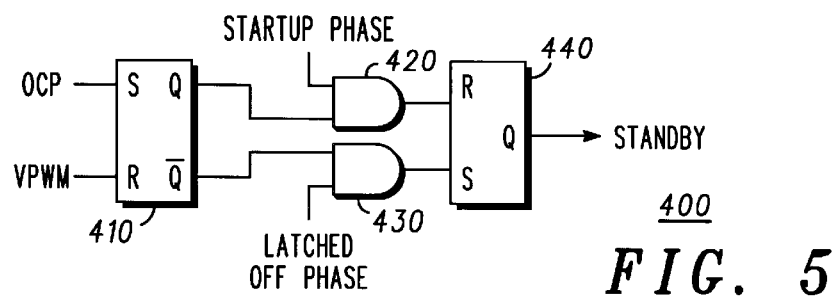
FIG. 5 is an illustrative block diagram of a latch arrangement for distinguishing between a standby mode and a fault mode.

Referring now also to FIG. 5, there is shown a latch arrangement 400 forming part of the standby block, and having first and second latches 410 and 440 respectively, and first and second AND gates 420 and 430 respectively.

The first latch 410 is set by an over-current signal derived from the Current sense block 120 and the drive control block 150, and reset by a regulation signal (Vpwm) derived from the control block 130 and the PWM control block 140.

The value of the first latch 410 is clocked to the first AND gate 420, which also receives a start-up phase signal, to be further described below.

The inverted value of the first latch 410 is clocked to the second AND gate 430, which also receives a latched-off phase signal, to be further described below.

The second latch 440 is set by an output of the second AND gate 430, and reset by an output of the first AND gate 420.

The determination of standby mode is performed in the following way. A latched-off phase 235 will occur if Vcc decays below the first under-voltage level 250, which is caused by insufficient power developed in the auxiliary winding 33. There are two possible reasons for this:

a) An over-current condition has occurred, causing the controller 10 to effectively switch off the SMPS.

b) Standby mode has been entered by the microprocessor 45 as described above.

In the latter case, a regulation signal will have been received during the working phase 225, due to the excess voltage present at the moment of reconfiguration. Therefore the first latch 410 will have a low value, its inverted output will be high, as will the two inputs to the second AND gate 430, resulting in the second latch 440 being set, thus indicating standby mode.

Similarly the determination of normal mode is performed in the following way. Assuming that the PWM control circuit 10 is already in standby mode, an additional current source (not shown) is switched on, effectively reducing the voltage threshold level of a comparator (not shown). Therefore when the microprocessor 45 decides to re-enter normal mode, and reconfigures the secondary windings accordingly, a large amount of current will be demanded during the start-up phase. This will lead to an over-current protection signal, with no regulation. In this way the first latch 410 will be latched with a high value, and consequently the output of the first AND gate 420 will be high (as a start-up phase signal will also be present). This leads to the second latch 440 being reset, effectively canceling the standby mode within the PWM control circuit 10, and returning to normal mode.

It will be appreciated that alternative embodiments to the one described above are possible. For example, the precise arrangement of the SMPS may differ from that described above, whilst still allowing the PWM control circuit 10 to operate substantially as described above.

Furthermore, the latch arrangement 400 may be replaced by an alternative logic arrangement implementing substantially the same function.

What is claimed is:

1. A pwm controller, comprising:
a start-up current source that supplies current to a power supply node during a first operating phase and is turned off during a third operating phase;
a driver circuit which is turned off during the first operating phase, enabled for drawing current from the power supply node during a second operating phase and turned off during the third operating phase;
a supply detector for detecting a supply voltage on the power supply node to initiate the third operating phase when the supply voltage falls below a first undervoltage level and terminate the third operating phase when the supply voltage falls below a second undervoltage level; and
a phase duration controller for controlling the duration of the third operating phase wherein the phase duration controller alters the first and second undervoltage levels and the rate at which the voltage at the power supply node falls from the first to the second undervoltage level.

2. The pwm controller of claim 1, wherein the phase duration controller includes a third phase current controller that determines a first level of current drawn from the power supply node during the third operating phase.

3. The pwm controller of claim 2, wherein the third phase current controller includes a programming node for connecting to an external programming resistor to set the first level of current drawn from the power supply node.

4. The pwm controller of claim 3, further comprising a switch having a first position for coupling the programming node to the power supply node to draw the first level of current.

5. The pwm controller of claim 4, wherein the switch has a second position coupled for drawing a second level of current from the power supply node, where the second level of current is less than the first level of current.

* * * * *